United States Patent
Jun et al.

(10) Patent No.: US 8,957,441 B2
(45) Date of Patent: Feb. 17, 2015

(54) INTEGRATED ANTENNA DEVICE MODULE FOR GENERATING TERAHERTZ CONTINUOUS WAVE AND FABRICATION METHOD THEREOF

(75) Inventors: Dong Suk Jun, Daejeon (KR);
Kwang-Yong Kang, Daejeon (KR);
Sungil Kim, Daejeon (KR); Mun Cheol Paek, Daejeon (KR); Han-Cheol Ryu, Daejeon (KR); Min Hwan Kwak, Daejeon (KR); Seung Beom Kang, Chungcheongbuk-do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 463 days.

(21) Appl. No.: 13/292,045

(22) Filed: Nov. 8, 2011

(65) Prior Publication Data
US 2012/0112230 A1  May 10, 2012

(30) Foreign Application Priority Data

Nov. 8, 2010 (KR) .......................... 10-2010-0110663
Oct. 24, 2011 (KR) .......................... 10-2011-0109017

(51) Int. Cl.
| | | |
|---|---|---|
| H01L 33/58 | (2010.01) | |
| H01L 33/30 | (2010.01) | |
| H01Q 19/06 | (2006.01) | |
| G01J 3/10 | (2006.01) | |
| G01J 3/42 | (2006.01) | |
| H01Q 9/28 | (2006.01) | |
| H01Q 15/00 | (2006.01) | |
| H01Q 15/08 | (2006.01) | |

(52) U.S. Cl.
CPC ................ *H01Q 19/062* (2013.01); *G01J 3/10* (2013.01); *G01J 3/42* (2013.01); *H01Q 9/285* (2013.01); *H01Q 15/0086* (2013.01); *H01Q 15/08* (2013.01)
USPC .......................................................... 257/98

(58) Field of Classification Search
None
See application file for complete search history.

(56) References Cited

U.S. PATENT DOCUMENTS

| | | | | |
|---|---|---|---|---|
| 6,985,118 B2 * | 1/2006 | Zarro et al. | .................... | 343/756 |
| 7,205,941 B2 * | 4/2007 | Wang et al. | ............ | 343/700 MS |
| 2009/0296197 A1 * | 12/2009 | Holzwarth et al. | ............ | 359/328 |
| 2011/0098033 A1 * | 4/2011 | Britz et al. | ................. | 455/422.1 |

FOREIGN PATENT DOCUMENTS

| | | |
|---|---|---|
| KR | 2009-0056764 A | 6/2009 |
| KR | 2011-0061827 A | 6/2011 |

\* cited by examiner

*Primary Examiner* — Matthew W Such
*Assistant Examiner* — Robert Carpenter
(74) *Attorney, Agent, or Firm* — Rabin & Berdo, P.C.

(57) ABSTRACT

The exemplary embodiments of the present invention include forming a photoconductor thin film on a front surface of a substrate; forming a photoconductor thin film pattern by patterning the photoconductor thin film; and forming a metal electrode on the photoconductor thin film pattern.

11 Claims, 18 Drawing Sheets

RESOLUTION WHEN META-MATERIAL LENS IS USED

RESOLUTION WHEN OPTICAL LENS IS USED

INTEGRATED ANTENNA DEVICE MODULE FOR GENERATING TERAHERTZ CONTINUOUS WAVE AND FABRICATION METHOD THEREOF

CROSS-REFERENCES TO RELATED APPLICATIONS

The present application claims priority under 35 U.S.C 119(a) to Korean Application No. 10-2010-0110663, filed on Nov. 8, 2010, and Korean Application No. 10-2011-0109017, filed on Oct. 24, 2011, in the Korean Intellectual Property Office, which is incorporated herein by reference in its entirety set forth in full.

BACKGROUND

Exemplary embodiments of the present invention relate to an integrated antenna device module for generating a terahertz continuous wave, and more particularly, to an integrated antenna device module for generating a terahertz continuous wave formed by directly depositing a photoconductor thin film on a silicon substrate and a fabrication method thereof.

A terahertz band (100 GHz to 10 THz) exists in an interface region between a light wave and a radio wave and is a frequency band technologically developed later. In order to develop the terahertz band, a new electromagnetic wave technology using the latest laser technology and semiconductor technology has been developed. The terahertz electromagnetic wave is oscillated in a pulse wave type using an ultra high speed photoconductive antenna (switch) based on a femtosecond optical pulse and a continuous wave type using an optical heterodyne scheme based on an optical mixer.

The terahertz band continuous wave system has been in the limelight as a terahertz spectroscopy or an imaging measurement system due to advantages such as frequency selectivity, price, size, measurement time, or the like, as compared with a pulse wave terahertz system.

When the continuous wave based on the optical heterodyne scheme inputs two continuous wave laser beams having the same strength but slightly different frequencies to the optical mixer formed on the photoconductive thin film such as low temperature grown (GaAs) of which carrier lifetime is short than picoseconds by aligning a wave surface, current modulation is generated in a terahertz band corresponding to a difference frequency and generated current is radiated as an electromagnetic wave in a terahertz band through an antenna.

Since a polycrystalline thin film can be grown regardless of a kind of a substrate, it is not necessarily to use a GaAs single crystal substrate so as to grow the existing LT-GaAs thin film. Therefore, the polycrystalline thin film can be grown even in silicon, quartz, sapphire, glass, or the like.

In particular, high-resistive silicon, which is a material having very high transmittance for the terahertz continuous wave, can be minimally absorbed into the existing GaAs substrate, thereby obtaining a stronger terahertz continuous wave signal.

Background art of the present invention is disclosed in KR Patent Laid-Open No. 10-2011-0061827 (Jun. 10, 2011).

In the related art, the LT-GaAs based photoconductive antenna device that has been widely in the photoconductive antenna is formed by depositing the photoconductor LT-GaAs thin film on the GaAs substrate, a photoconductive antenna electrode pattern on the LT-GaAs thin film, and then, attaching a substrate portion to a condenser lens made of the high-resistive silicon by cutting the photoconductor devices formed with each electrode pattern one by one.

However, the above-mentioned method needs to accurately align the electrode pattern with the center of the silicon lens and is very difficult to adhere the photoconductor device to the silicon lens so as to prevent a space from being formed between the substrate and the lens, when the photoconductor device is attached to the silicon lens.

In particular, when a slight space is present at the time of attaching the photoconductor device to the silicon lens, the scattering of the terahertz continuous wave is generated by an air layer, thereby causing the terahertz signal noise. Therefore, it is impossible to obtain the accurate spectroscopy or image.

Further, a semi-insulating GaAs substrate that is a semiconductor material has the lower transmittance for the terahertz continuous wave as compared with the high-resistive silicon, thereby reducing the terahertz signal to noise (SNR) ratio.

SUMMARY

An embodiment of the present invention relates to an integrated antenna device module for generating a terahertz continuous wave by directly depositing a photoconductor thin film on silicon and a fabrication method thereof.

In one embodiment, an integrated antenna device module for generating a terahertz continuous wave includes: a photoconductor thin film pattern formed on a front surface of a substrate to generate a terahertz continuous wave; a metal electrode formed on the photoconductor thin film pattern to apply DC bias voltage to the photoconductor thin film pattern; and a focusing (condensing) meta-material lens formed on a rear surface of the substrate to focus the terahertz continuous wave radiated from the photoconductor thin film pattern.

The substrate may be a high-resistive silicon substrate or an InP substrate.

The photoconductor thin film pattern may be a polycrystalline InGaAs thin film.

The photoconductor thin film pattern may be an ion implanted single crystal InGaAs thin film.

The integrated antenna device module for generating a terahertz continuous wave may further include a power improvement antenna formed on the substrate in a ring shape in a radiation direction to shield a surface wave and focus radiation energy.

The integrated antenna device module for generating a terahertz continuous wave may further include a focusing alignment meta-material lens spaced apart from the focusing meta-material lens to control a focus of the focusing meta-material lens and obtain a three-dimensional image of an object.

The integrated antenna device module for generating a terahertz continuous wave may further include a superhemispheric condenser lens formed on the focusing alignment meta-material lens to obtain directivity characteristics of the terahertz continuous wave radiated from the focusing alignment meta-material lens and the three-dimensional image of the object.

The superhemispheric condenser lens may be made of high-resistive silicon.

The integrated antenna device module for generating a terahertz continuous wave may further include a terahertz wave condenser lens spaced apart from the superhemispheric condenser lens to focus the terahertz continuous wave radiated from the superhemispheric condenser lens.

The integrated antenna device module for generating a terahertz continuous wave may further include a horn antenna mounted on the focusing meta-material lens to radiate the terahertz continuous wave of the focusing meta-material lens.

The integrated antenna device module for generating a terahertz continuous wave may further include: a focusing alignment meta-material lens spaced apart from the focusing meta-material lens to control a focus of the focusing meta-material lens, thereby controlling a focus so as to obtain a three-dimensional image of an object; and a horn antenna mounted on the focusing alignment meta-material lens to radiate the terahertz continuous wave radiated from the focusing alignment meta-material lens.

In another embodiment, a method for manufacturing an integrated antenna device module for generating a terahertz continuous wave, including: forming a photoconductor thin film on a front surface of a substrate; forming a photoconductor thin film pattern by patterning the photoconductor thin film; and forming a metal electrode on the photoconductor thin film pattern.

The method for manufacturing an integrated antenna device module for generating a terahertz continuous wave may further include: forming a first metal pattern on a rear surface of the substrate; forming a first nitride film on the rear surface of the substrate and the first metal pattern; forming a second metal pattern on the first nitride film; and forming a second nitride film on the first nitride film and the second metal pattern.

The method for manufacturing an integrated antenna device module for generating a terahertz continuous wave may further include forming a third nitride film on the front surface of the surface and the photoconductor thin film pattern.

The substrate may be a high-resistive silicon substrate or an InP substrate.

The photoconductor thin film pattern may be a polycrystalline InGaAs thin film.

The photoconductor thin film pattern may be an ion implanted single crystal InGaAs thin film.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
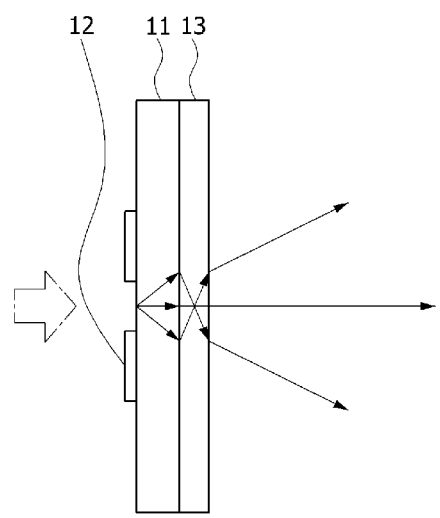
FIG. 1 is a configuration diagram of a photoconductive antenna of an integrated antenna device module for generating a terahertz continuous wave in accordance with a first embodiment of the present invention.

Hereinafter, embodiments of the present invention will be described with reference to accompanying drawings. However, the embodiments are for illustrative purposes only and are not intended to limit the scope of the invention.

Hereinafter, an integrated antenna device module for generating a terahertz continuous wave and a fabrication method thereof in accordance with an embodiment of the present invention will be described in detail with reference to the accompanying drawings. In describing the embodiment, a thickness of lines illustrated in the drawings, a size of components, etc., may be exaggeratedly illustrated for clearness and convenience of explanation. In addition, terms described to be below are terms defined in consideration of functions in the present invention, which may be changed in accordance with the intention or practice of a user or an operator. Therefore, these terms will be defined based on contents throughout the specification.

The integrated antenna device module for generating a terahertz continuous wave in accordance with the embodiment of the present invention includes a meta-material lens solving a resolution limitation of a power improvement antenna and the existing optical lens in a photoconductive antenna. Hereinafter, embodiments of the present invention will be described with reference to FIGS. 1 to 11.

FIG. 1 is a configuration diagram of a photoconductive antenna of an integrated antenna device module for generating a terahertz continuous wave in accordance with a first embodiment of the present invention.

A photoconductive antenna 10 of an integrated antenna device module for generating a terahertz continuous wave in accordance with a first embodiment of the present invention includes a photoconductor thin film pattern 11, a metal electrode 12, and a focusing (condensing) meta-material lens 13 capable of controlling a three-dimensional image of an object with high resolution.

A substrate 1 is high-resistive silicon or InP.

The metal electrode 12 is formed on the photoconductor thin film pattern 11 to apply DC bias voltage to the photoconductor thin film pattern 11, thereby radiating the terahertz continuous wave.

The photoconductor thin film pattern 11 is deposited on a front surface of the substrate to radiate the terahertz continuous wave when an ultra short pulse, that is, a femtosecond laser pulse having a pulse time of 10 to 100 fps is input.

As the photoconductor thin film pattern 11, a polycrystalline InGaAs thin film or an ion implanted single crystal InGaAs thin film may be used.

As ion 15 implanted into the single crystal InGaAs, Br+, Fe+, O+, N+, and Au+ may be used. In this case, used energy, dose, and implant angle may be changed according to a mass of ion 14 and may be variously applied according to resistivity, hole mobility, and carrier lifetime.

The photoconductor thin film pattern 11 generates electron-hole pairs therein and generates photocurrent while charges move to both electrodes by bias when the ultra short pulse, that is, the femtosecond laser pulse is input in the state in which the DC bias voltage of 10V to 50V is applied by the metal electrode. In this case, the photocurrent flows for very short time by the ultra short pulse. At this time, electric field is generated by the change in photocurrent. The electric field becomes a terahertz wave when a moving time of photocharge is as short as a picosecond level.

The focusing meta-material lens 13 may control the three-dimensional image of the object with the high resolution and overcome the resolution limitation of the existing optical lens. The focusing meta-material lens 13 is formed on a rear surface of the substrate 1 to focus the terahertz continuous wave radiated from the photoconductor thin film pattern 11 and facilitate the matching.

The terahertz continuous wave of the photoconductive thin film pattern 11 is radiated to the entire space. In this case, a dielectric constant of the photoconductor thin film pattern 11 and the focusing meta-material lens 13 is much larger than the free space. Therefore, most of terahertz continuous wave is radiated in a direction of the focusing meta-material lens 13.

The process of radiating the terahertz continuous wave of the photoconductive antenna 10 in accordance with the first embodiment of the present invention first applies the DC bias voltage of 10 to 50 V to the photoconductor thin film pattern 11 by the metal electrode.

In this case, the ultra short pulse is input to the photoconductor thin film pattern 11 from the external devices. Therefore, the electron-hole pairs are generated in the photoconductor thin film pattern 11 and the photocurrent is generated while the charges move to the both electrodes by the bias.

In this case, the photocurrent flows for very short time by the ultra short pulse. At this time, the electric field is generated by the change in photocurrent. The electric field becomes the terahertz wave when the moving time of photocharge is as short as a picosecond level.

When the terahertz continuous wave is generated in the photoconductor thin film pattern 11, most of the terahertz continuous waves are radiated in the direction of the focusing meta-material lens 13.

Figure 2:
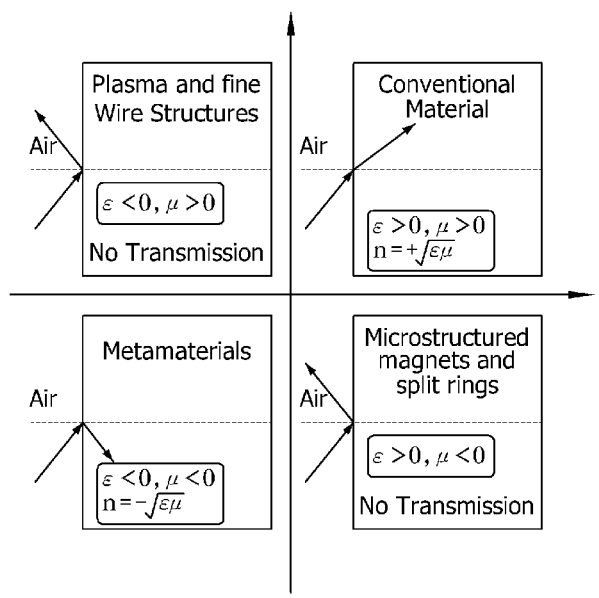
FIG. 2 is a diagram illustrating a refractive index condition according to a material in accordance with the embodiment of the present invention.

FIG. 2 is a diagram illustrating a refractive index condition according to a material in accordance with the embodiment of the present invention.

In the first embodiment of the present invention, the photoconductor thin film pattern 11 and the focusing meta-material lens 13 overcoming the resolution limitation of the optical lens are preferable to maintain the high transmittance and refractive index. Referring to FIG. 2, a material in a region ($\in >0$, $\mu >0$, $n=+\sqrt{\in \mu}$) in which the refractive index and permeability is high may be used for the photoconductor thin film pattern 11 and the focusing meta-material lens 13. For reference, $\in$ is a dielectric constant, $\mu$ is transmittance, and n is refractive index. This is equally applied to other embodiments.

Hereinafter, in the second to ninth embodiments of the present invention, the detailed description of the same portion as the first embodiment will be omitted.

Figure 3:
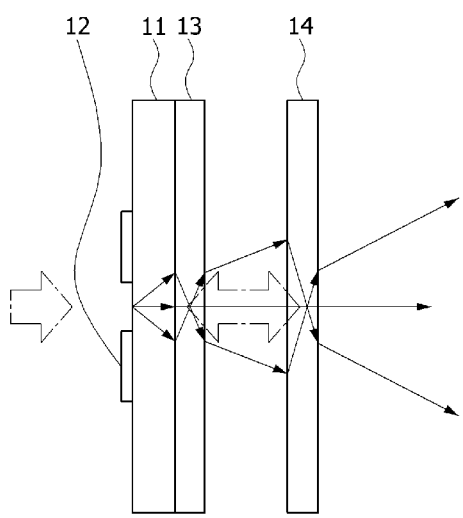
FIG. 3 is a configuration diagram of a photoconductive antenna of an integrated antenna device module for generating a terahertz continuous wave in accordance with a second embodiment of the present invention.

FIG. 3 is a configuration diagram of a photoconductive antenna of an integrated antenna device module for generating a terahertz continuous wave in accordance with a second embodiment of the present invention.

The photoconductive antenna 10 of an integrated antenna device module for generating a terahertz continuous wave further includes the focusing alignment meta-material lens 14 in addition to the first embodiment of the present invention.

As illustrated in FIG. 3, the focusing meta-material lens 14 is disposed so as to be spaced apart from the focusing meta-material lens 13 and control a focal distance, thereby optimizing the energy radiated from the focusing meta-material lens 13.

The terahertz continuous wave has radio wave transmittance. A portion invisible in a visible region may be seen and the three-dimensional image of the object with the high resolution may be obtained by controlling the focal distance of the focusing alignment meta-material lens 14 and transmitting light to the object according to the above characteristics.

Figure 4:
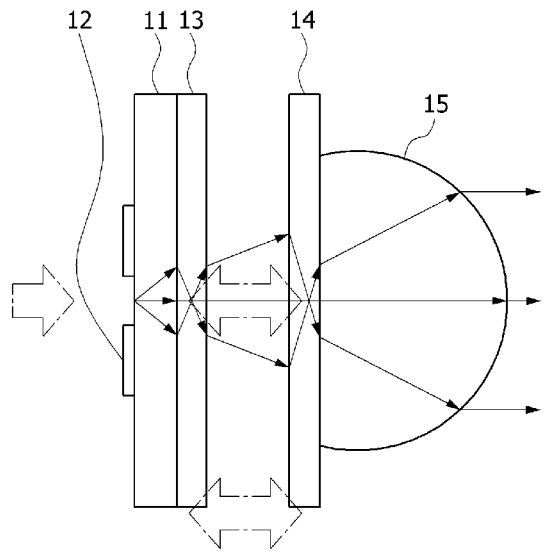
FIG. 4 is a configuration diagram of a photoconductive antenna of an integrated antenna device module for generating a terahertz continuous wave in accordance with a third embodiment of the present invention.

FIG. 4 is a configuration diagram of a photoconductive antenna of an integrated antenna device module for generating a terahertz continuous wave in accordance with a third embodiment of the present invention.

The photoconductive antenna 10 of an integrated antenna device module for generating a terahertz continuous wave in accordance with the third embodiment of the present invention further includes a superhemispheric condenser lens 15 in addition to the second embodiment of the present invention.

As illustrated in FIG. 4, the superhemispheric condenser lens 15 is formed as the superhemisphere so as to be mounted on the focusing alignment meta-material lens 14, such that the terahertz continuous wave radiated from the focusing alignment meta-material lens 14 is focused in a predetermined direction to more facilitate the matching. The super-hemispheric shape means a shape identical to that of the condenser lens 15 illustrated in FIG. 5. The super-hemispheric shape means a shape further extended upward to approach a spherical shape from a hemispherical shape.

The superhemispheric condenser lens 15 may be manufactured by the high-resistive silicon having the high transmittance and the large refractive index for the terahertz continuous wave so as to focus the terahertz continuous wave in a predetermined direction.

The terahertz continuous wave has radio wave transmittance. A portion invisible in a visible region may be seen and the three-dimensional image of the object with the high resolution may be obtained by controlling the focal distance of the superhemispheric condenser lens 14 and transmitting light to the object according to the above characteristics.

Figure 5:
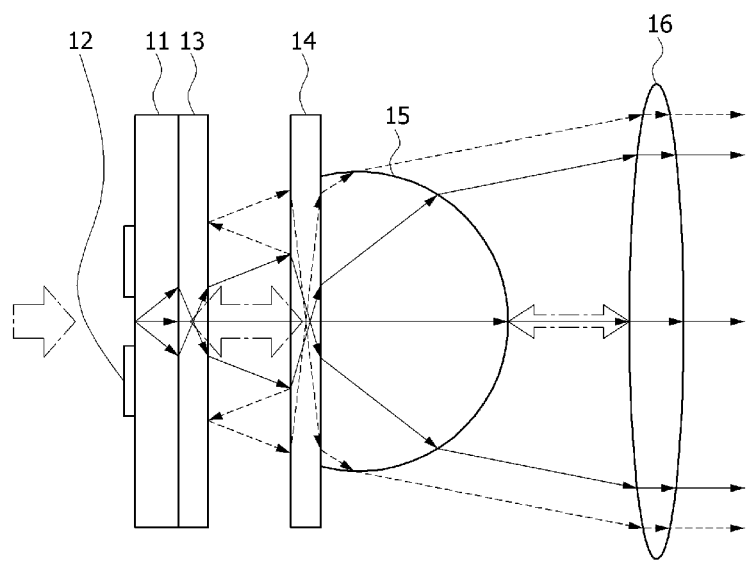
FIG. 5 is a configuration diagram of a photoconductive antenna of an integrated antenna device module for generating a terahertz continuous wave in accordance with a fourth embodiment of the present invention.

FIG. 5 is a configuration diagram of a photoconductive antenna of an integrated antenna device module for generating a terahertz continuous wave in accordance with a fourth embodiment of the present invention.

The photoconductive antenna 10 of an integrated antenna device module for generating a terahertz continuous wave in accordance with the fourth embodiment of the present invention further includes a terahertz wave condenser lens 16 in addition to the third embodiment of the present invention.

As illustrated in FIG. 5, the terahertz wave condenser lens 16 controls the focal distance by being spaced apart from the superhemispheric condenser lens 15 by a predetermined distance, thereby reducing the radiation loss of the terahertz continuous wave and improving the spatial resolution of the terahertz continuous wave.

Figure 6:
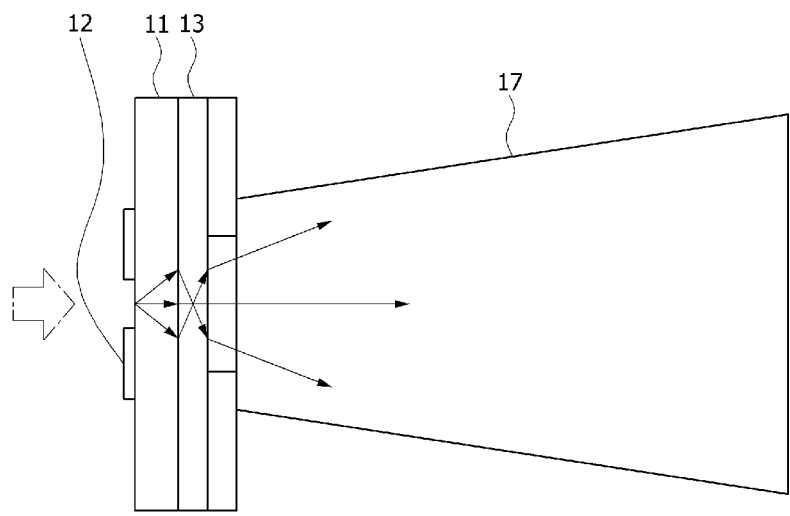
FIG. 6 is a configuration diagram of a photoconductive antenna of an integrated antenna device module for generating a terahertz continuous wave in accordance with a fifth embodiment of the present invention.

FIG. 6 is a configuration diagram of a photoconductive antenna of an integrated antenna device module for generating a terahertz continuous wave in accordance with a fifth embodiment of the present invention.

The photoconductive antenna 10 of an integrated antenna device module for generating a terahertz continuous wave in accordance with the fifth embodiment of the present invention further includes a horn antenna 17 in addition to the first embodiment of the present invention.

As illustrated in FIG. 6, the horn antenna 17 is mounted on the focusing meta-material lens 13 to improve directivity of the terahertz continuous wave radiated from the focusing meta-material lens 13.

Figure 7:
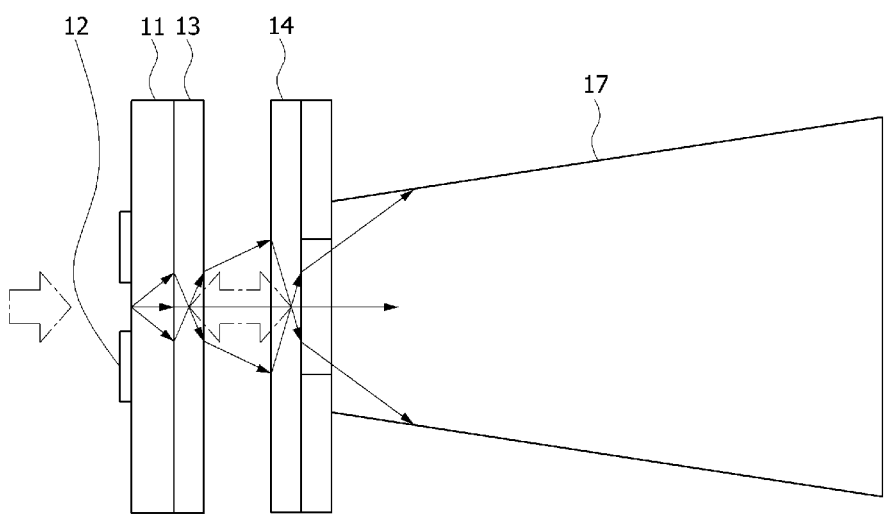
FIG. 7 is a configuration diagram of a photoconductive antenna of an integrated antenna device module for generating a terahertz continuous wave in accordance with a sixth embodiment of the present invention.

FIG. 7 is a configuration diagram of a photoconductive antenna of an integrated antenna device module for generating a terahertz continuous wave in accordance with a sixth embodiment of the present invention.

The photoconductive antenna 10 of an integrated antenna device module for generating a terahertz continuous wave in accordance with the sixth embodiment of the present invention further includes the focusing alignment meta-material lens 14 and the horn antenna 17 in addition to the first embodiment of the present invention.

As illustrated in FIG. 7, the focusing meta-material lens 14 control the lens focal distance so as to be spaced apart from the focusing meta-material lens 13 by a predetermined distance and is provided with the horn antenna 17.

The horn antenna 17 improves the directivity and the spatial resolution of the terahertz continuous wave that is focused in the focusing alignment meta-material lens 14 and reduces the radiation loss of the terahertz continuous wave.

For reference, although the embodiment of the present invention illustrates the case in which the directivity of the terahertz continuous wave is improved by additionally mounting the horn antenna 17, the embodiment of the present invention is not limited to the above-mentioned embodiments. As a result, various antennas may be adopted if necessary.

Figure 8:
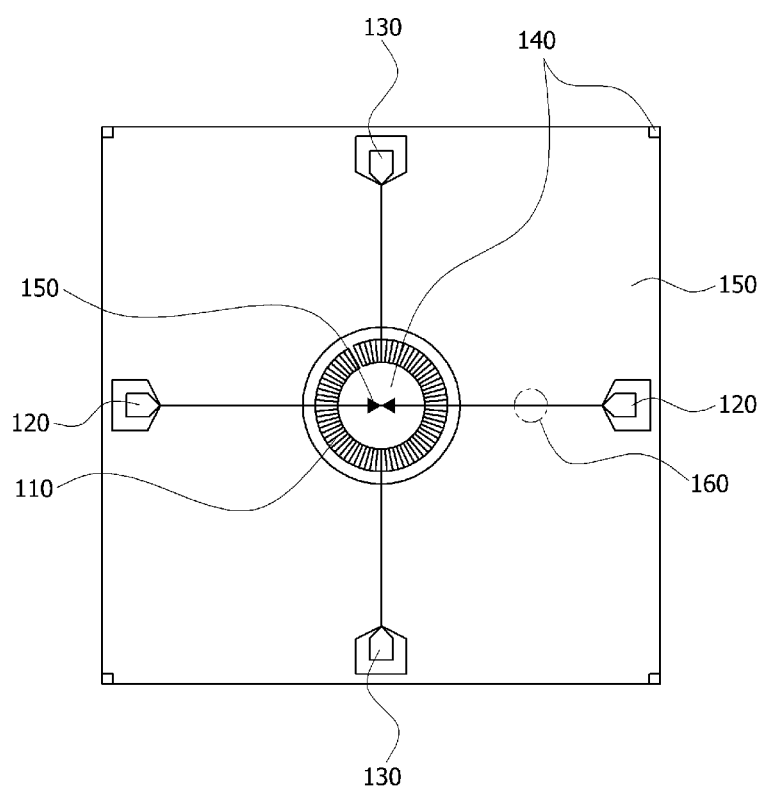
FIG. 8 is a configuration diagram of a photoconductive antenna of an integrated antenna device module for generating a terahertz continuous wave in accordance with a seventh embodiment of the present invention.

FIG. 8 is a configuration diagram of a photoconductive antenna of an integrated antenna device module for generating a terahertz continuous wave in accordance with a seventh embodiment of the present invention.

The integrated antenna device module for generating a terahertz continuous wave in accordance with a seventh embodiment of the present invention includes the photoconductive antenna 10 and the power improvement antennas 110 disposed in plural in a radiation shape on the substrate 1.

In this case, as the photoconductive antenna 10, any one of a bow-tie antenna 100, a dipole antenna, a folded dipole antenna, a log-periodic antenna, a spiral antenna, a double-slot antenna, and a double-dipole antenna may be used.

For reference, the embodiment of the present invention describes the antenna 100 by way of example.

As illustrated in FIG. 8, the bow-tie antenna 100 is disposed on the center of the substrate 140 and the plurality of power improvement antennas 110 are distributed around the bow-tie antenna 100 in a ring shape.

In this structure, when the DC bias voltage of 10 to 50 V is applied by a bias pad 120 and the femtosecond laser pulse is input between the electrodes (not illustrated) of the bow-tie antenna 100, the electron-hole pairs are generated within the photoconductor thin film pattern 11 and the photocurrent is generated while the charges move to both electrodes 120 by the bias.

The photocurrent flows for very short time by the ultra short pulse. At this time, the electric field is generated by the change in photocurrent. The electric field becomes the terahertz wave when the moving time of photocharge is as short as a picosecond level.

Therefore, the radiation direction of the bow-tie antenna 100, the length of the power improvement antenna 100, the interval between the power improvement antennas 100, the width of the power improvement antenna 110, and the forming angle of the power improvement antenna 110 are optimized, such that the antenna matching may be more easily performed than the photoconductive antenna in accordance with the related art.

Therefore, when using the bow-tie antenna 100 in accordance with the embodiment of the present invention, the impedance matching characteristics with a photomixer having the output impedance of 10 k$\Omega$ or more is greatly improved, and the output of the terahertz continuous wave may be greatly improved accordingly.

For reference, reference numeral 130 is a signal input and output pad, reference numeral 160 is a coplanar waveguide feed line, and reference numeral 150 is a ground.

Figure 9:
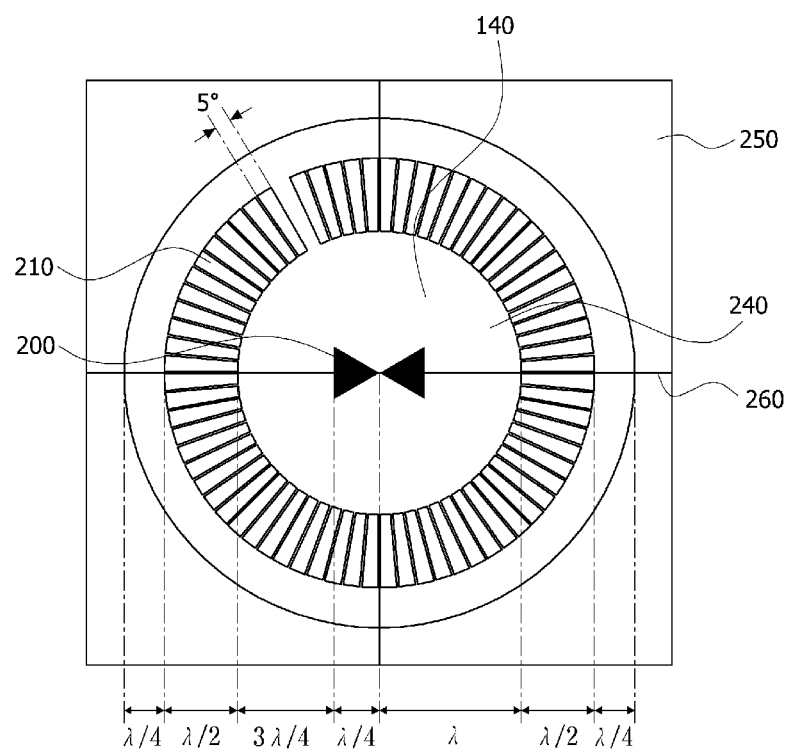
FIG. 9 is a configuration diagram of a photoconductive antenna of an integrated antenna device module for generating a terahertz continuous wave in accordance with an eighth embodiment of the present invention.

FIG. 9 is a configuration diagram of a photoconductive antenna of an integrated antenna device module for generating a terahertz continuous wave in accordance with an eighth embodiment of the present invention.

In the integrated antenna device module for generating a terahertz continuous wave in accordance with the eight embodiment of the present invention, a pattern of a power improvement antenna 210 optimizes the radiation direction of the bow-tie antenna 200, the length of the power improvement antenna 210, the interval between the power improvement antennas 210, the width of the power improvement antenna 210, and the forming angle of the power improvement antenna 210, thereby more facilitating the matching of the antenna than the photoconductive antenna 10 in accordance with the related art.

In this case, the power improvement antenna 210 suppresses the terahertz continuous wave radiated to the surface of the substrate 240 and improves the power of the terahertz continuous wave by being focused in the dielectric direction.

As illustrated in FIG. 9, the power improvement antenna 210 in the radiation shape is formed in several ring shapes to sequentially interrupt the power improvement antenna 110 and focus the radiation energy to the dielectric material, thereby greatly improving the antenna gain.

For reference, referring to FIG. 9, the length ($\lambda/4$) of the radiation direction of the bow-tie antenna 200, the length of the power improvement antenna 210, the interval between the power improvement antennas 210, the width of the power improvement antenna 210, the forming angle (5°) of the power improvement antenna 210 may be adopted.

Figure 10:
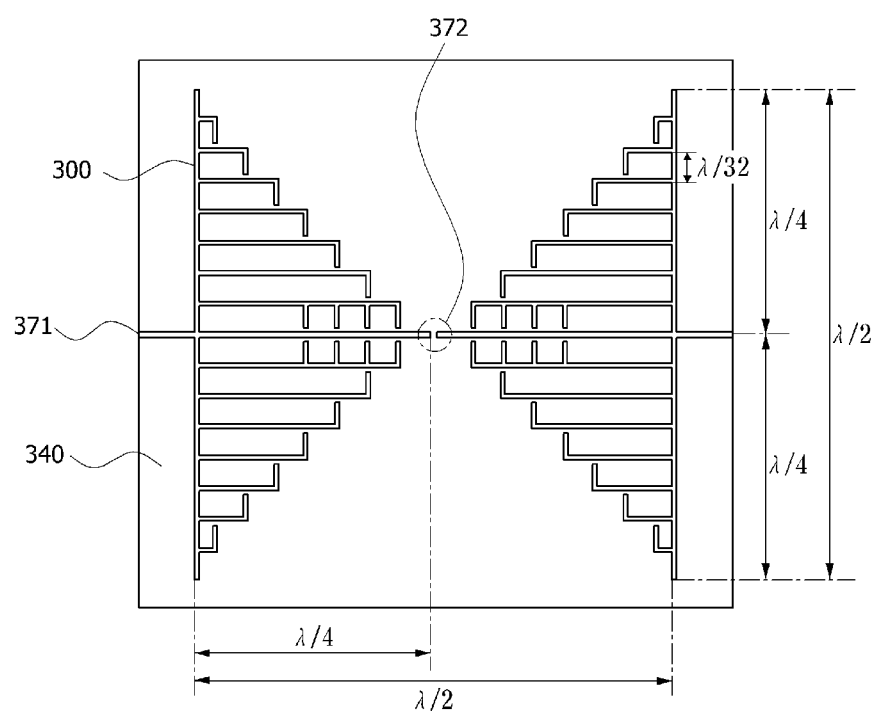
FIG. 10 is a configuration diagram of a photoconductive antenna of an integrated antenna device module for generating a terahertz continuous wave in accordance with a ninth embodiment of the present invention.

FIG. 10 is a configuration diagram of a photoconductive antenna of an integrated antenna device module for generating a terahertz continuous wave in accordance with a ninth embodiment of the present invention.

In the integrated antenna device module for generating a terahertz continuous wave in accordance with the ninth embodiment of the present invention, a bow-tie antenna 30 has an advantage of the dipole antenna and the bow-tie antenna.

Generally, the dipole antenna may have high input resistance and narrow bandwidth and the bow-tie antenna have a high bandwidth and a low input resistance.

Therefore, the bow-tie antenna 30 in accordance with the ninth embodiment of the present invention has the high input resistance of the dipole antenna and the wide bandwidth of the bow-tie antenna.

As illustrated in FIG. 10, the length of the bow-tie antenna 300 is λ/2 and in the embodiment of the present invention, the length of the bow-tie antenna 300 is λ/2 and a width of a gap is 0.2 mm. In addition, a line width 371 of the bow-tie antenna 300 may be 0.2 mm and an interval between the line widths may be λ/32.

In this case, the line width 371 and the gap 372 of the bow-tie antenna 300 determines the input resistance of the bow-tie antenna 300 and the length of λ determines the central frequency of the selected frequency.

Figure 11:
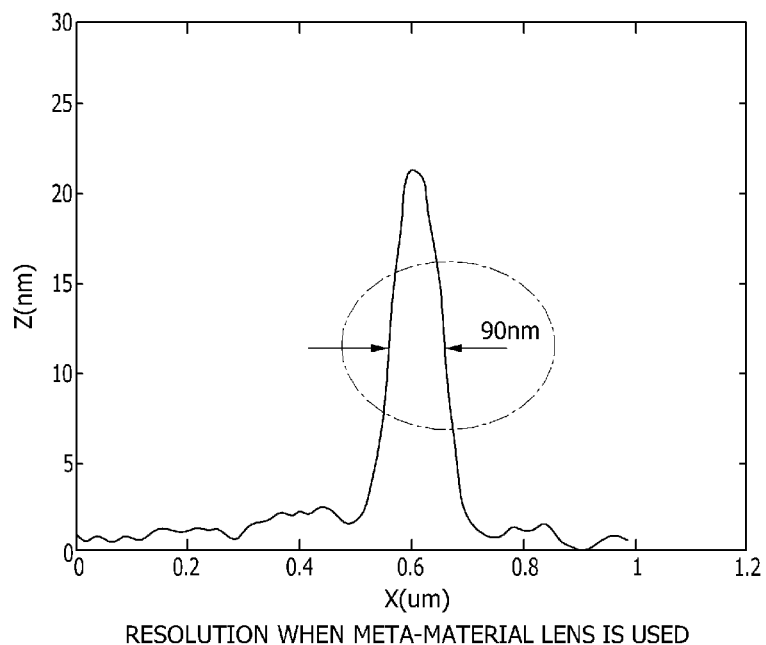
FIG. 11 is a diagram illustrating resolution when a meta-material lens and an optical lens in accordance with the embodiment of the present invention are used.
Figure 11:
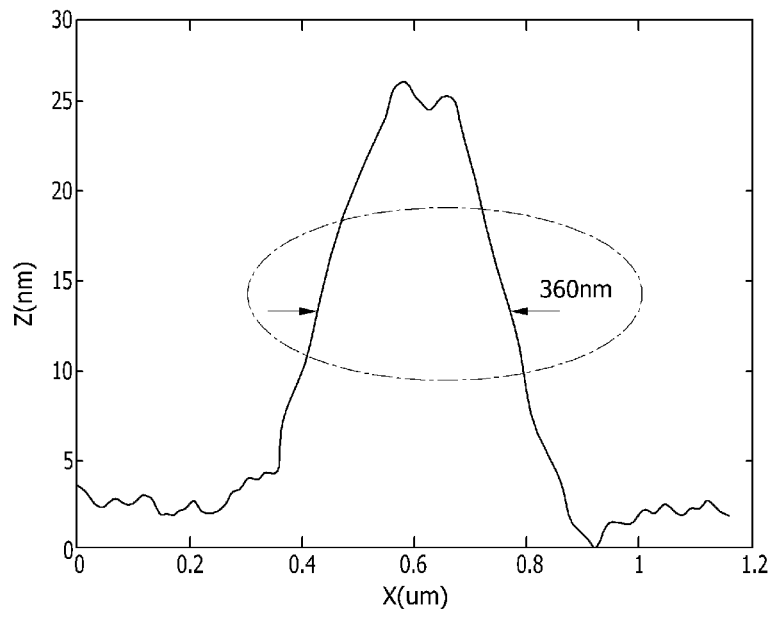

FIG. 11 is a diagram illustrating resolution when a meta-material lens and an optical lens in accordance with the embodiment of the present invention are used.

FIG. 11 is a diagram illustrating the resolution when the meta-material lens in accordance with the embodiment of the presented invention and the optical lens in accordance with the related art are used. The existing optical lens may have the resolution of 360 nm, while the meta-material lens may have the resolution of 90 nm.

As described above, the meta-material lens in accordance with the embodiment of the present invention may obtain the higher resolution than that of the optical lens in accordance with the related art.

FIGS. 12 to 20 are diagrams a method for fabricating a photoconductive antenna of an integrated antenna device module for generating a terahertz continuous wave in accordance with a first embodiment of the present invention.

Figure 12:
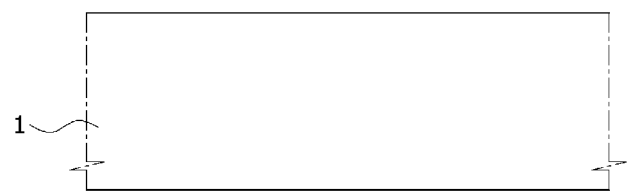
FIGS. 12 to 20 are diagrams a method for fabricating a photoconductive antenna of an integrated antenna device module for generating a terahertz continuous wave in accordance with a first embodiment of the present invention.
Figure 13:

As illustrated FIG. 12, a method for manufacturing the photoconductive antenna 10 of an integrated antenna device module for generating a terahertz continuous wave in accordance with the first embodiment of the present invention forms the high-resistive silicon or the substrate 1 of InP and as illustrated in FIG. 13, deposits the photoconductive thin film 11a on the flat surface of the substrate 1. That is, the photoconductor thin film 11a is not separately attached to the substrate 1.

When the photoconductor thin film 11a is deposited, the rear surface of the substrate 1 is surface-treated so as to be flat and then, the focusing meta-material lens 13 is formed.

Figure 14:
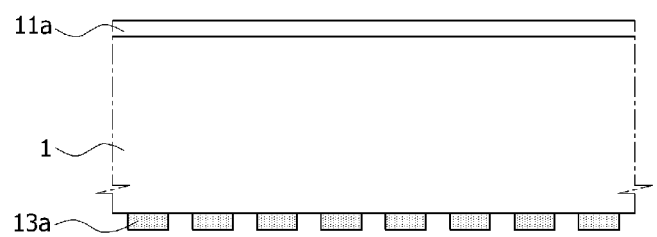

That is, as illustrated in FIG. 14, a first metal pattern 13a is formed on the rear of the surface 1. The first metal pattern 13a is used for the meta-material lens.

Figure 15:
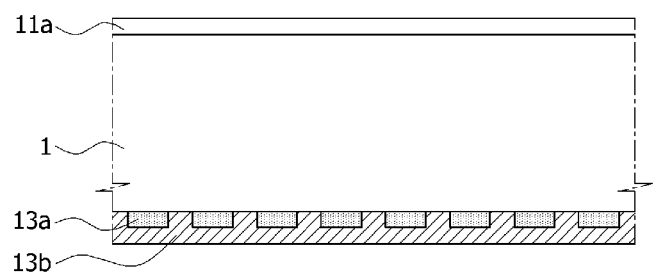

As illustrated in FIG. 15, the first metal pattern 13a is formed and a first nitride film 13b is deposited on the rear of the substrate 1 and the first metal pattern 13a to protect the first metal pattern 13a.

Figure 16:
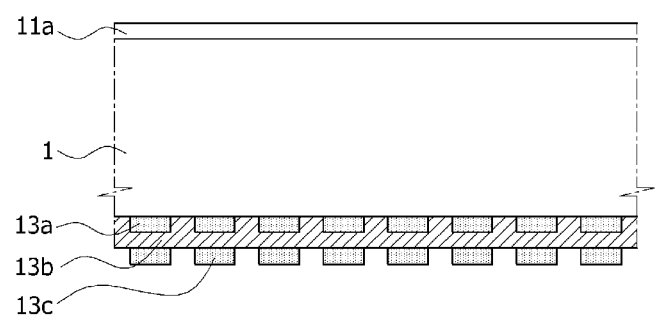

As illustrated in FIG. 16, the first nitride film 13b is deposited and then, a second metal pattern 13c is formed on the first nitride film 13b. The second metal pattern 13c is used for the meta-material lens.

Figure 17:
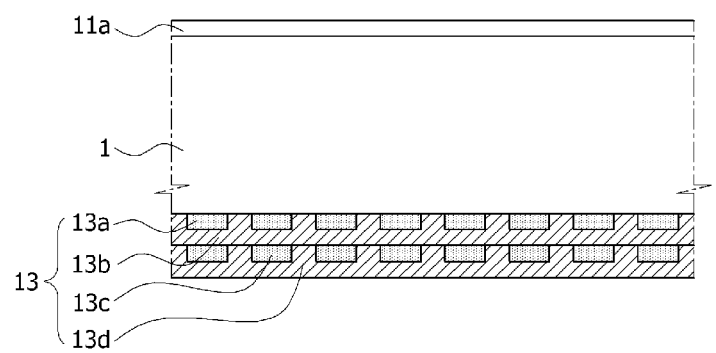
Figure 18:
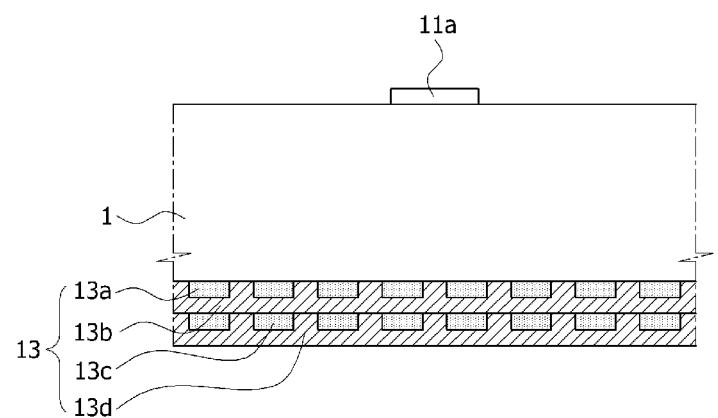

As illustrated in FIG. 17, the second metal pattern 13c is formed and then, the second nitride 13d is deposited on the second nitride film 13d and the second metal pattern 13c to protect the second metal pattern 13c.

As described above, when first and second metal pattern processes for the metal-material lens complete, the photoconductor thin film 11a deposited on the front surface of the substrate is etched and patterned, thereby forming the photoconductor thin film pattern 11.

The photoconductor thin film pattern 11 is deposited on the front surface of the substrate 1 and radiates the terahertz continuous wave by the ultra short pulse, that is, the femtosecond laser pulse incident fro the external devices (not illustrated).

As the photoconductor thin film pattern 11, the polycrystalline InGaAs thin film or a ion 14 implanted single crystal InGaAs thin film may be used. The fabrication method using the single crystal InGaAs thin film will be described with reference to FIGS. 21 TO 30.

When the photoconductor thin film pattern 11 is the polycrystalline InGaAs, molecular beam epitaxy (MBE) may be used as the deposition equipment. In addition, various methods such as metalorganic chemical vapor deposition (MOCVD) or sputter, or the like, may be used.

Figure 19:
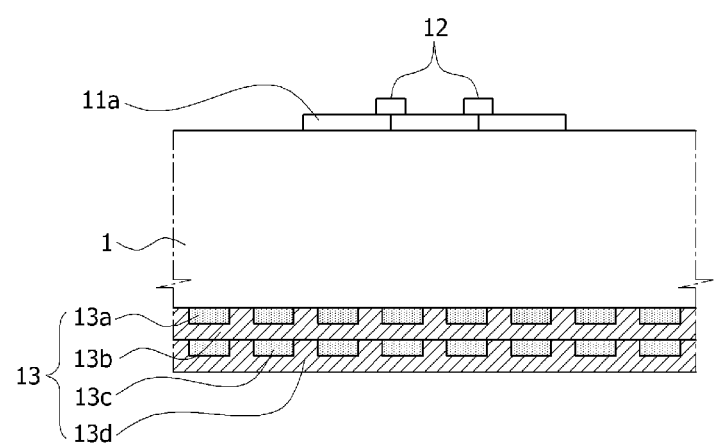

As illustrated in FIG. 19, the photoconductor thin film pattern 11 is formed by etching the photoconductor thin film 11a and then, the metal electrode 12 is formed on the photoconductor thin film pattern 11.

In this case, the process is performed by matching the central portions between the metal electrode 12 and the focusing meta-material lens 13 formed on the rear of the substrate 1, such that the separate alignment process does not need to perform.

Figure 20:
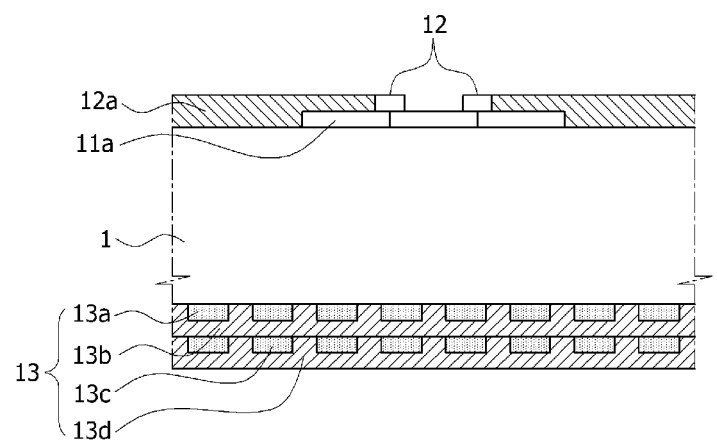
Figure 21:
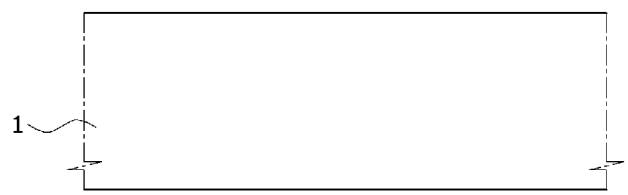
FIGS. 21 to 30 are diagrams a method for fabricating a photoconductive antenna of an integrated antenna device module for generating a terahertz continuous wave in accordance with a second embodiment of the present invention.
Figure 22:
Figure 23:
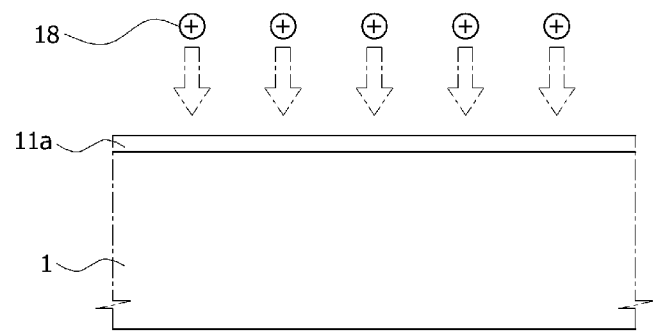
Figure 24:
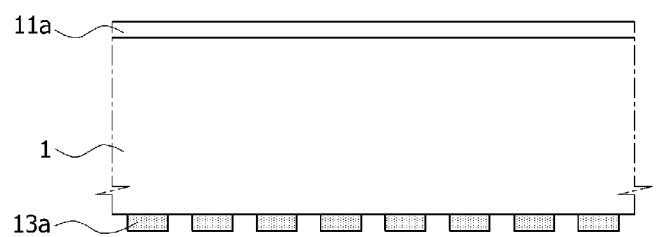
Figure 25:
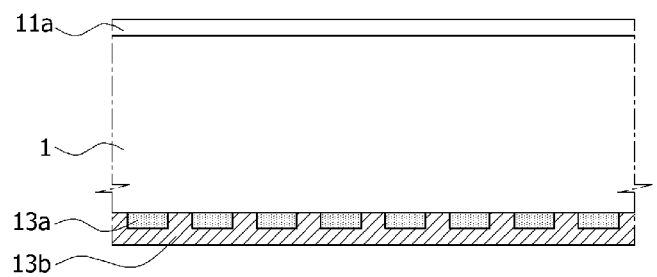
Figure 26:
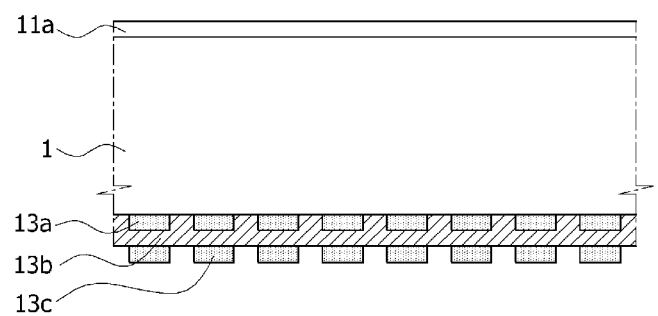
Figure 27:
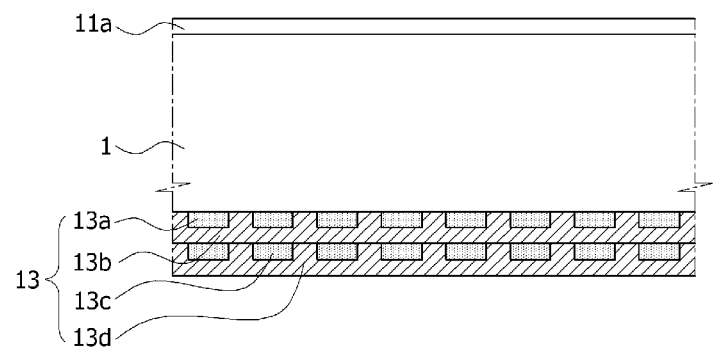

As illustrated in FIG. 20, the metal electrode 12 is formed and then, a third nitride film 12a for protecting the electrode is formed on the metal electrode 12.

As described above, in accordance with the embodiment of the present invention, the substrate 1 on which the focusing meta-material lens 13 is formed is provided with the photoconductor thin film pattern 11 and the metal electrode 12, thereby more reducing the use of the substrate 1 than the method in accordance with the related art.

In addition, the photoconductor thin film pattern 11 and the metal electrode 12 needs not be manufactured separately and attached and aligned, such that the process may be simplified, the time and costs may be reduced, and the error in the alignment between metal electrode 12 and the focusing meta-material lens 13 may be reduced.

FIGS. 21 to 30 are diagrams a method for fabricating a photoconductive antenna of an integrated antenna device module for generating a terahertz continuous wave in accordance with a second embodiment of the present invention.

The method for manufacturing the photoconductive antenna of an integrated antenna device module for generating a terahertz continuous wave in accordance with the second embodiment of the present invention is a method for manufacturing the photoconductor thin film pattern 11 using the single crystal InGaAs. Except for the process, the second embodiment is the same as the first embodiment and therefore, the detailed description of the same portions will be omitted.

The method for manufacturing the photoconductive antenna 10 of an integrated antenna device module for generating a terahertz continuous wave in accordance with the second embodiment of the present invention manufactures the photoconductor thin film 11a using the single crystal InGaAs, the ion 14 is additionally implanted into the photoconductor thin film 11a as illustrated in FIGS. 21 to 30.

In this case, as the implanted ion 14, Br+, Fe+, O+, N+, Au+, or the like, may be used. The used energy, the dose, and the implant angle may be changed according to the mass of the ion 14 and may be variously applied according to the resistivity, the hole mobility, and the carrier lifetime.

Figure 28:
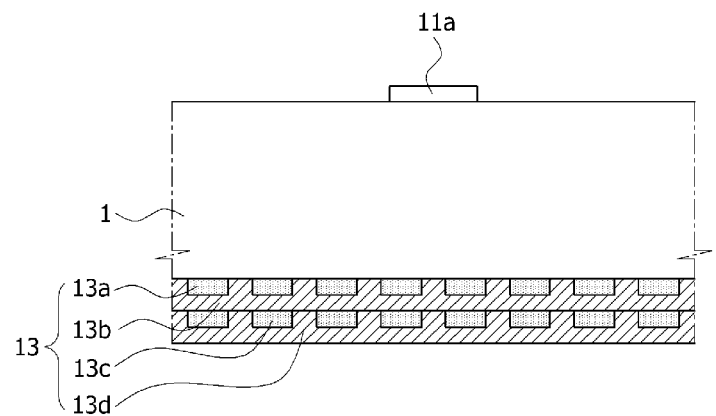
Figure 29:
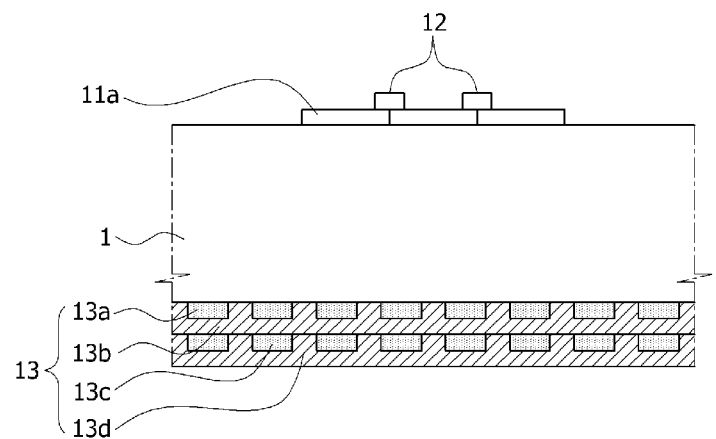
Figure 30:
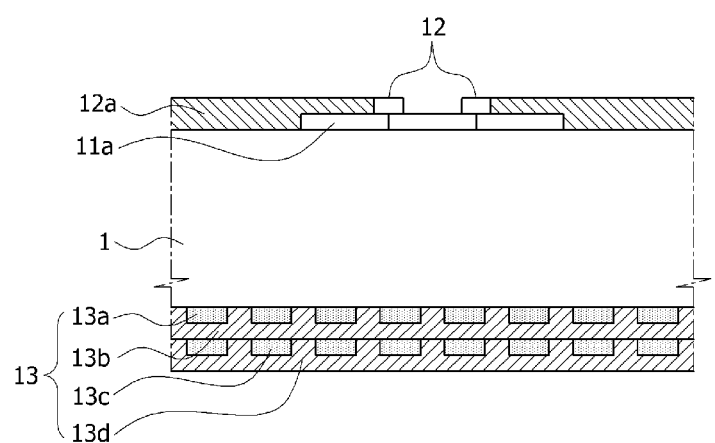

As described above, as illustrated in FIGS. 23 to 27, the photoconductor thin film 11a of the single crystal InGaAs is formed and then, the focusing meta-material lens 13 is formed. Thereafter, as illustrated in FIGS. 28 to 30, the metal electrode 12 is formed.

As described above, the method for manufacturing the integrated antenna device module for generating a terahertz continuous wave deposits the photoconductor thin film pattern 11 on the front surface of the substrate 1 and directly forms the focusing meta-material lens 13 on the rear surface of the substrate 1.

Through this, the use of the substrate 1 may be reduced by forming the focusing meta-material lens 13 on the rear surface thereof and forming the photoconductor thin film pattern 11 on the front surface thereof, such that the manufacturing process is simplified to save the time and costs and the errors may be reduced at the time of aligning the metal electrode 12 and the focusing meta-material lens 13.

As set forth above, the embodiments of the present invention can simplifying the entire manufacturing process by directly depositing the photoconductor thin film on the silicon lens and implementing the meta-material lens on the silicon substrate and reduce time and costs by removing the causes of error occurrence.

Further, the embodiments of the present invention can improve the performance and reliability of the photoconductive antenna by simplifying the process and removing the portion where the central portion of the silicon lens and the metal electrode are aligned with each other as in the related art.

In addition, the embodiment of the present invention can overcome the resolution limitation of the optical lens by using the existing optical lens as the meta-material lens, which is based on mass production when the terahertz system is commercialized in the future.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An integrated antenna device module for generating a terahertz continuous wave, comprising:
    a photoconductor thin film pattern directly deposited on a front surface of a substrate to generate a terahertz continuous wave;
    a metal electrode formed on the photoconductor thin film pattern to apply DC bias voltage to the photoconductor thin film pattern; and
    a focusing meta-material lens formed on a rear surface of the substrate to focus the terahertz continuous wave radiated from the photoconductor thin film pattern.

2. The module of claim 1, wherein the substrate is a high-resistive silicon substrate or an InP substrate.

3. The module of claim 1, wherein the photoconductor thin film pattern is a polycrystalline InGaAs thin film.

4. The module of claim 1, wherein the photoconductor thin film pattern is an ion implanted single crystal InGaAs thin film.

5. The module of claim 1, further comprising a power improvement antenna formed on the substrate in a ring shape in a radiation direction to shield a surface wave and focus radiation energy.

6. The module of claim 1, further comprising a focusing alignment meta-material lens spaced apart from the focusing meta-material lens to control a focus of the focusing meta-material lens and obtain a three-dimensional image of an object.

7. The module of claim 6, further comprising a superhemispheric condenser lens formed on the focusing alignment meta-material lens to obtain directivity characteristics of the terahertz continuous wave radiated from the focusing alignment meta-material lens and the three-dimensional image of the object.

8. The module of claim 7, wherein the superhemispheric condenser lens is made of high-resistive silicon.

9. The module of claim 8, further comprising a terahertz wave condenser lens spaced apart from the superhemispheric condenser lens to focus the terahertz continuous wave radiated from the superhemispheric condenser lens.

10. The module of claim 1, further comprising a horn antenna mounted on the focusing meta-material lens to radiate the terahertz continuous wave of the focusing meta-material lens.

11. The module of claim 1, further comprising:
    a focusing alignment meta-material lens spaced apart from the focusing meta-material lens to control a focus of the focusing meta-material lens, thereby controlling a focus so as to obtain a three-dimensional image of an object; and
    a horn antenna mounted on the focusing alignment meta-material lens to radiate the terahertz continuous wave radiated from the focusing alignment meta-material lens.

* * * * *